April 28, 1964   F. W. JOHNSON   3,130,964
COMPOSITE LOW RATE SPRING AND SHOCK ABSORBER
Filed June 7, 1962

INVENTOR.
Frederick W. Johnson
BY
Marvin Moody
Attorney

United States Patent Office 3,130,964
Patented Apr. 28, 1964

3,130,964
COMPOSITE LOW RATE SPRING AND
SHOCK ABSORBER
Frederick W. Johnson, Cedar Rapids, Iowa, assignor to
Collins Radio Company, Cedar Rapids, Iowa, a corporation of Iowa
Filed June 7, 1962, Ser. No. 200,818
1 Claim. (Cl. 267—1)

This invention relates in general to shock absorbers and in particular to shock pads which might be used, for example, in air dropping military or other equipment.

It is often desirable to transport equipment by helicopter and then to disconnect such equipment from the helicopter so that it engages the ground. Such operations must be carried out with a minimum jar or shock to the equipment.

It is an object of this invention, therefore, to provide a combination shock mount comprising prestressed springs mounted in a plastic foam material.

Another object of the invention is to provide an improved shock pad.

A feature of this invention is found in the provision for a pair of parallel-spaced plates which are mounted between means for limiting the maximum distance between the plates and with a plurality of prestressed spring means mounted between the plates to bias them apart and with the space between the plates being filled with a plastic foam material to form a shock pad.

Further features, objects, and advantages of this invention will become apparent from the following description and claim when read in view of the accompanying drawings, in which:

Figure 1:
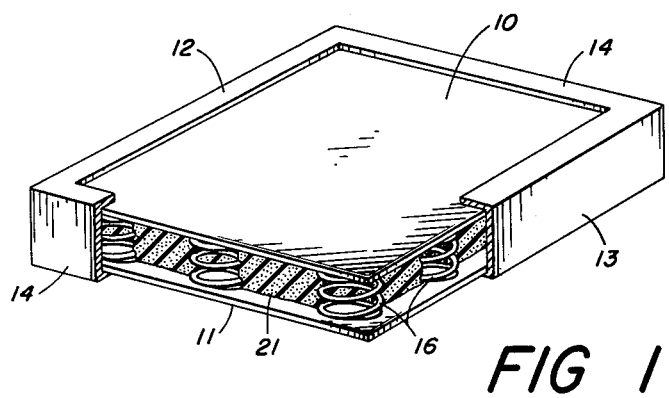
FIGURE 1 is a partial cut-away view of the shock pad of this invention.

With reference to FIGURE 1, a pair of rigid or semi-rigid plates 10 and 11 are mounted between channel members 12 and 13. End channel members 14 are attached to channel members 12 and 13 and hold the plates 10 and 11 in place.

Mounted between plates 10 and 11 are a plurality of spring members 16. The springs are prestressed so as to urge the plates 10 and 11 apart sufficiently so that when a load 17 is mounted on the top plate 10 the plate 10 will still engage the channels 12, 13, and 14.

Figure 2:
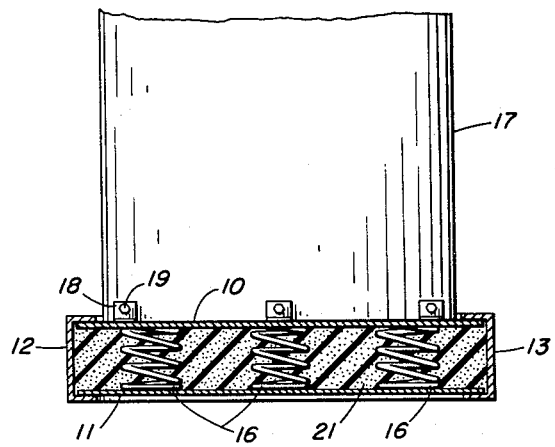
FIGURE 2 is an end view of the shock pad of this invention attached to a suitable equipment.

As shown in FIGURE 2, the member 17 which might be, for example, a radio transmitter, might be mounted on the top plate 10 by means of angle irons 18 which are attached to the plate 10 and to the transmitter by suitable holding means, as for example bolts 19.

The springs 16 are selected so that they are prestressed in compression sufficiently to support the weight of the body 17 so that plate 10 does not move toward the plate 11 under static load.

The space between the plates 10 and 11 is filled with a plastic foam material, as for example silicon foam rubber, which is not subject to deformation under static load since the springs 16 support the weight of the body 17.

However, when the bottom plate 11 engages the ground or other obstruction, the shock or jar causes the springs 16 and foam rubber 21 to compress so that plate 10 moves toward plate 11 and the foam rubber assists the springs in absorbing the shock so as to cushion the member 17 substantially.

Since the foam rubber is normally not deformed under static load, it does not take a permanent "set" such as would occur if the shock pad were formed of only a foam plastic material. In other words, foam plastic material when subjected to a continuous load deforms and becomes thinner. Such a permanent "set" occurs due to the plastic deformation of the material. However, in the present invention the plastic foam 21 cannot take a permanent set because the springs 16 are prestressed and carry the load of the body 17 and no deformation of the plastic foam 21 occurs. However, when subject to a decelerating force both the springs 16 and the plastic foam absorb the shock and substantially cushion the deceleration of the mass 17.

It is seen that this invention provides an improved shock mount comprising plastic foam material and prestressed spring which prevent the plastic foam from taking a permanent deformation under load, thus resulting in an improved shock mount.

Although this invention has been described with respect to particular embodiments thereof, it is not to be so limited, as changes and modifications may be made therein which are within the full intended scope of the invention as defined by the appended claim.

I claim:

A shock mount for an equipment comprising a pair of parallel-mounted plates, means for attaching one of said plates to said equipment, rigid channel members connected to said plates to limit the maximum distance that they can move relative to each other but which do not obstruct the motion of the plates toward each other such that the rigid channel members limit the maximum distance between but not the inward movements of the parallel-mounted plates, a plurality of spaced spring means mounted between said plates and biasing said plates apart and the spaced spring means comprising plurality of coil springs, and plastic foam filling the space between the plates to form a unitary shock mount.

References Cited in the file of this patent

UNITED STATES PATENTS

| 919,876 | Jolivet | Apr. 27, 1909 |
| 1,972,005 | Berbeck | Aug. 28, 1934 |
| 2,206,757 | Tolalay | July 2, 1940 |
| 2,859,959 | Hardigg | Nov. 11, 1958 |
| 2,896,937 | Miller | July 28, 1959 |
| 3,010,540 | Dahlen | Nov. 28, 1961 |
| 3,049,730 | Wall et al. | Apr. 21, 1962 |
| 3,050,278 | Gardner et al. | Aug. 21, 1962 |
| 3,093,092 | Martin et al. | June 11, 1963 |

FOREIGN PATENTS

| 1,096,707 | Germany | Jan. 5, 1961 |